March 30, 1948. W. F. ERTZMAN 2,438,550
METHOD OF AND APPARATUS FOR INDICATING THE CONDITION OF AN ATMOSPHERE
Filed Feb. 5, 1944 2 Sheets-Sheet 1

INVENTOR.
WILLIAM F. ERTZMAN
BY
E. B. Spangenberg
ATTORNEY.

March 30, 1948. W. F. ERTZMAN 2,438,550
METHOD OF AND APPARATUS FOR INDICATING THE CONDITION OF AN ATMOSPHERE
Filed Feb. 5, 1944 2 Sheets-Sheet 2
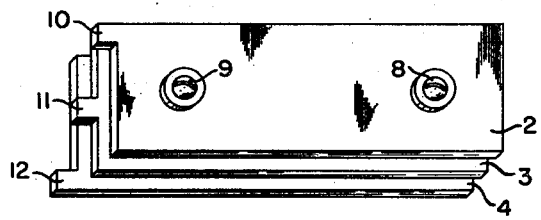
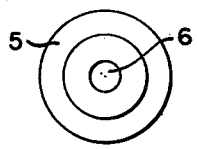
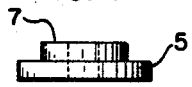
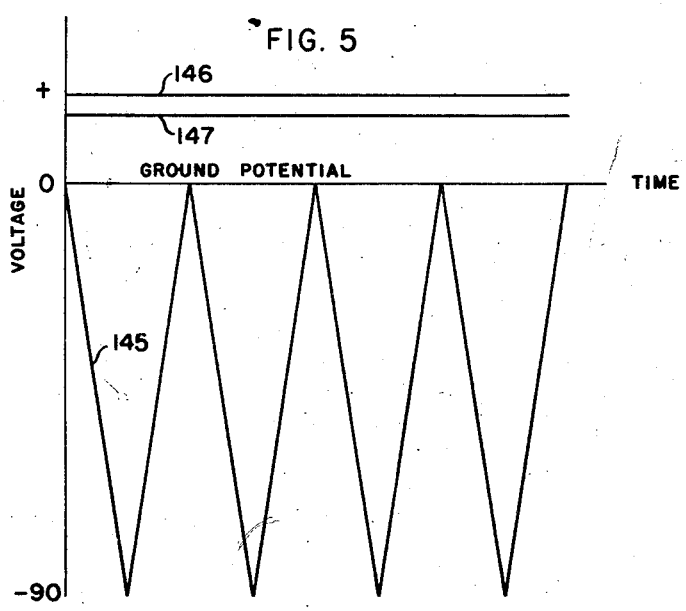
INVENTOR.
WILLIAM F. ERTZMAN Patented Mar. 30, 1948

2,438,550

UNITED STATES PATENT OFFICE 2,438,550

METHOD OF AND APPARATUS FOR INDICATING THE CONDITION OF AN ATMOSPHERE

William F. Ertzman, Pittsburgh, Pa., assignor to The Brown Instrument Company, Philadelphia, Pa., a corporation of Pennsylvania Application February 5, 1944, Serial No. 521,181

18 Claims. (Cl. 175—183)

The present invention relates to a method of and apparatus for indicating the condition of an atmosphere.

A general object of the invention is to provide a novel method of and apparatus for detecting the presence of a particular gas or vapor in an atmosphere containing a plurality of different gases or vapors.

It is another object of the invention to provide a novel method of and apparatus for measuring and indicating or recording the concentration or amount of a particular gas or vapor in any mixture of gases or vapors.

Still another object of the invention is to provide a universally adaptable instrument which may be readily adjusted to successively provide a measure of the concentration of all of the gases or vapors in any mixture of gases or vapors.

A further object of the invention is to provide an instrument which is capable of providing a continuous indication of the concentration of a particular gas or vapor in an atmosphere containing a plurality of different gases or vapors.

Another object of the invention is to provide an instrument which is capable of instantly providing an indication of the presence and/or concentration of a particular gas or vapor in a mixture of gases or vapors. It is also an object of the invention to provide such an analyzer which is capable of instantaneous response to variations in the concentration of the gas or vapor under detection.

A more specific object of the invention is to provide an improved method of and apparatus for indicating or recording gas or vapor contents found in electric or fuel fired furnaces.

It is also an object of the invention to provide an improved gas or vapor analyzing instrument having a detecting element or measuring cell which may be inserted directly into the atmosphere containing the gas or vapor to be detected, thus eliminating the need for drying or otherwise treating the said atmosphere as required by existing prior art arrangements. Another object of the invention is to provide such an improved instrument which is simple and inexpensive.

While the precise theory of operation of the novel gas analysis method and apparatus of my present invention is not now known to me, it is believed to utilize the principle that the ionization potential for every gas or vapor is different. The ionization potential of any gas or vapor is the voltage needed to provide the energy required to dislodge an electron from an atom of the gas or vapor. A definite amount of energy is required to dislodge an electron from an atom of any particular gas or vapor and the amount of energy has been found to be different for every gas or vapor.

The novel method and apparatus of my invention is also believed to utilize the principle that every gas or vapor has a different specific inductive capacity which is altered if the gas or vapor is subjected to some extraneous force. The specific inductive capacity of a gas or vapor may be defined as the ratio of the capacity of a condenser with the gas or vapor as the dielectric to the capacity of the same condenser with air or a vacuum as the dielectric.

In one practical embodiment of the invention, the presence of a particular gas or vapor in an atmosphere including a plurality of different gases or vapors is detected and a measure of the concentration of that gas or vapor is obtained by employing the said atmosphere as the dielectric for two similar electrical capacitances. An electric potential having a component fluctuating at a frequency of approximately 400 cycles per second and an amplitude greater than the ionization potential of all of the gases or vapors of the mixture is impressed across the plates of each capacitance. The amplitude of the fluctuating component of potential is less than that necessary to effect a visible discharge between the plates of the capacitances. The electric potential applied to the plates of each capacitance also includes a steady or direct current component. The steady component applied to the plates of one capacitance is of slightly greater magnitude than the steady potential component applied to the plates of the other, and its magnitude is so chosen as to be approximately the same as the ionization potential for the gas or vapor it is desired to detect while the steady potential applied to the plates of the other capacitance is so chosen as to be slightly less than that ionization potential. With this arrangement I have discovered that the potential variations between the plates of said one capacitance will be greater than the potential variations between the plates of the other capacitance and that the difference in amplitude of the said potential variations between the two may be utilized as a measure of the concentration of the gas or vapor under detection as well as an indication of the presence of that gas or vapor in the mixture.

Whether the difference in the potential variations between the plates of the one capacitance as compared to the potential variations between the other capacitance is established solely or partially by a flow of silent and invisible discharge currents through the gas or vapor dielectric of each capacitance, or is established solely or partially by alteration in the specific inductive capacity of the gas or vapor comprising the dielectric of the capacitances is not known to me. The difference in the said potential variations may be due to either or both of these causes.

It is possible that in the practical embodiment of my invention referred to above, the application of a common fluctuating potential and separate unidirectional potentials of different amplitudes to the plates of each capacitance creates silent and invisible fluctuating discharge currents of different amplitudes of variation between the plates of each capacitance which causes a greater dissipation of energy in one capacitance than the other and is evidenced by the potential variations between the plates of one capacitance being different than the potential variations between the plates of the other capacitance.

It is also possible that the complex electric potentials applied to the plates of each capacitance constitute an extraneous force which alters to different extents the dielectric qualities of the gas or vapor dielectric medium between the pairs of plates. Such action may well occur since the steady or unidirectional potential applied to the plates of one capacitance is greater than the ionization potential of the gas or vapor it is desired to detect while the steady potential applied to the plates of the other capacitance is slightly less than that ionization potential. Hence, the difference in the amplitudes of the potenial variations between the pairs of capacitance plates may be due to this cause.

Regardless of the origin of the difference in the amplitude of the potential variations between the capacitance plates, I have definitely determined that such a difference exists, and also that the difference is proportional to the concentration of the gas or vapor under detection in the mixture and may be utilized to provide a reliable and accurate measure of such concentration as well as of the presence of such gas or vapor.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Of the drawings:

Fig. 2 illustrates in greater detail the physical structure of the measuring cell or detecting element of the arrangement of Fig. 1;

Figs. 3 and 4 are plan and elevation views showing the insulating spacers employed to hold the plates of the measuring cell of Fig. 2 rigidly in spaced apart relation; and Fig. 5 is a graph illustrating the electric potentials applied to the plates of the measuring cell and including a fluctuating component and two steady components of different magnitudes.

Figure 1:
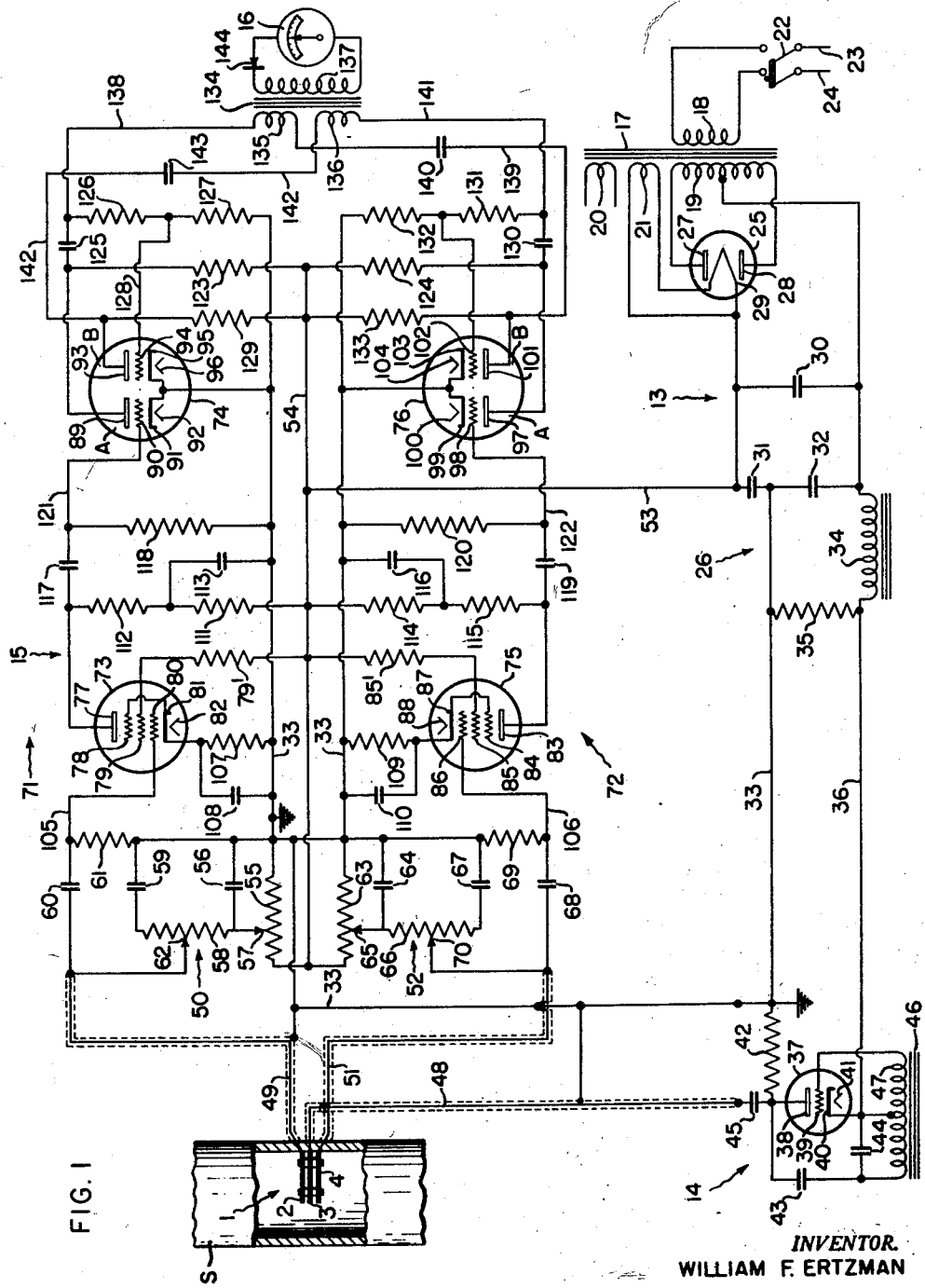
Fig. 1 illustrates, more or less diagrammatically, one embodiment of the present invention.

In Fig. 1 I have diagrammatically indicated at S an enclosure which may well be a stack leading from a furnace, not shown, and through which the furnace gases are conducted away. Such an enclosure would ordinarily contain a mixture of two or more gases and/or vapors. In order to obtain an indication of the presence of a particular one of the gases or vapors of the mixture and also a measure of its concentration, a measuring cell I comprised of three closely spaced plates 2, 3 and 4, as seen in Fig. 2, is inserted directly into the interior of the enclosure, being mounted therein in any convenient manner. Plates 2, 3 and 4 are made of electrically conducting material and are electrically insulated from each other as by suitable insulating spacers 5 which may be made of plaster of Paris and are illustrated in detail in Figs. 3 and 4. Each of the spacers 5 is provided with an opening 6 through which a machine screw may be inserted for clamping the assembly of plates and spacers rigidly together, and also is provided with a shoulder 7 which extends through suitable openings provided in the plates 2, 3 and 4. The spacers serve to relatively position the plates as well as to electrically insulate them. The assembly is held together by two machine screws 8 and 9 and associated nuts not shown. A spacer is inserted between each of the plates 2, 3 and 4 at each of the machine screws 8 and 9 and also between the heads of the machine screws at the outside surface of plate 2 and between the nuts and the outside surface of plate 4. When the nuts are tightened a rigid assembly is provided in which the plates 2, 3 and 4 are electrically insulated from each other and from the machine screws and associated nuts.

Desirably a respective tab 10, 11 and 12 is provided on the end of each of the plates 2, 3 and 4, as shown in Fig. 2, for the purpose of facilitating the making of electrical connection to the plates.

By way of illustration only, the plates 2, 3 and 4 may be composed of one-thirty second inch thick brass plates which are six inches long and two inches wide and are spaced one-sixty fourth of an inch apart. The tabs 10, 11 and 12 may each be one-quarter of an inch square. Since the plate dimensions and their spacing are a measure of the electrical capacitance between adjacent plates, it will be apparent that when the same dielectric subjected to the same conditions is employed, the capacitance between plates 2 and 3 will be exactly the same as that between the plates 3 and 4. It will be evident as the description proceeds, however, that my invention is not limited to the use of plates 2, 3 and 4 of any particular dimensions or spacing or material and that the dimensions, spacing and material of the plates is of little, if any, consequence as long as the electrical capacitance between the plates 2 and 3 is approximately the same as that between the plates 3 and 4 when the same dielectric subjected to the same conditions is employed. Precise equality in electrical capacitance between the pairs of plates is not required inasmuch as slight differences which may be encountered because of the limitations of manufacturing methods may be compensated for in a manner to be described.

While the measuring cell assembly may be arranged in any convenient manner in relation to the stream of moving gases through the enclosure S, I now prefer to position the assembly in such manner that the outside surface of plates 2 and 4 are disposed at right angles to the path of the moving stream of gases or vapors in order to minimize any tendency for particles of dust and other foreign material to accumulate between the plates. In excessively dirty atmospheres the measuring cell may be covered by a spun glass cover in order to prevent the accumulation of foreign material between the plates. Such a cover does not prevent the gases in the enclosure 1 from permeating between the plates 2 and 3, and 3 and 4, but merely acts as a filter to clean the gases to which the plates are exposed. It is noted that it may also be desirable to use such a spun glass cover as a fire-check in those applications where the gases in the enclosure S are inflammable or explosive.

In addition to the measuring cell 1, the gas analysis apparatus devised according to the present invention includes a power pack 13, an electronic oscillator 14, an electronic amplifier 15, and a measuring instrument 16, the latter of which has been shown only diagrammatically, but which may be any suitable indicating, recording or controlling instrument that is capable of response to the output energy of the electronic amplifier 15.

The power pack 13 may be designed to operate at any commercial voltage or frequency and is employed to furnish all of the energy needed for the operation of the entire apparatus. It will be apparent that, if desired, the power pack 13 may be eliminated and the energy for the operation of the apparatus may be obtained from dry batteries. I prefer to employ the power pack, however, inasmuch as its use obviates the need for periodic replacement of batteries.

The power pack 13 includes a step-up and a step-down transformer 17 having a line voltage primary winding 18, a center tapped high voltage secondary winding 19, and low voltage secondary windings 20 and 21. The line voltage primary winding 18 is connected by means of a double pole single throw switch 22 to alternating current supply lines 23 and 24 which may supply alternating current of any commercially available voltage and frequency.

Included in the power pack is also a full wave rectifier tube 25 and a filter 26. The rectifier tube 25 may be of any conventional type such as the type 5Z4 which is sold commercially and comprises a pair of anodes 27 and 28 and a filament type cathode 29. Energizing current is supplied to the cathode 29 from the low voltage transformer secondary winding 21. One terminal of the high voltage transformer secondary winding 19 is connected to the anode 27 of rectifier tube 25 and the other terminal of that winding is connected to the anode 28. The center tap on the winding 19 constitutes the negative potential terminal of the rectifier, and the filament cathode 29 constitutes the positive potential terminal thereof.

Filter 26 includes a condenser 30 which is connected between the positive and negative potential terminals of the rectifier, and a pair of series connected condensers 31 and 32 which are also connected between the said terminals. The point of engagement of condensers 31 and 32 is connected to a grounded conductor 33. The unidirectional potential produced across the terminals of the condenser 31 is utilized to supply the required direct current voltages to the electronic amplifier 15 and also to the measuring cell 1 while the unidirectional potential produced across condenser 32 is employed to energize the oscillator 14. An inductive choke 34 and a fixed resistance 35 are inserted between the terminals of condenser 32 and the oscillator 14 for the purpose of providing additional filtering of the oscillator energizing voltage and for preventing any oscillatory current flow from the oscillator 14 to the power pack 13. The oscillator energizing voltage is derived from the grounded conductor 33 and a conductor 36 which is connected to the point of engagement of choke 34 and resistance 35. Power pack 13 is preferably so designed that the potential of the conductor 36 is approximately 120 volts negative with respect to the grounded conductor 33.

The oscillator 14 includes a vacuum tube 37 which desirably may be a triode of the conventional 7A4 type and is tuned and arranged to generate a pulsating potential having a frequency of approximately 400 cycles per second. Tube 37 is provided with an anode 38, a control grid 39, a heater type cathode 40, and a heater filament 41. The cathode 40 is connected to the negative unidirectional potential supply conductor 36 while the anode 37 is connected through a fixed resistance 42 to the positive potential supply conductor 33. Oscillator 14 also includes three condensers 43, 44 and 45 and an iron core transformer 46 on which a center tapped winding 47 is wound. The cathode 40 of tube 37 is connected to the center tap on winding 47 and the right end of the latter is connected to the control grid 39. The left end of winding 47 is connected through condenser 43 to the anode 38.

Condenser 44 is a tuning condenser and is connected between the center tap and the left end of winding 47 for tuning the oscillator to the desired operating frequency of approximately 400 cycles per second. The transformer 46, in conjunction with condenser 44, operates to create a feedback of energy from the output circuit of tube 37 to the input circuit including control grid 39 and cathode 40 as is required to establish and maintain a regularly pulsating current flow of the operating frequency through the resistance 42 in the anode circuit.

Since the right end terminal of the resistance 42 is connected to the grounded conductor 33, it should be observed that the potential of that terminal remains fixed at ground potential. The potential of the left end terminal of resistance 42 is permitted to fluctuate in either direction with respect to ground potential, but it is driven in the negative direction only by the oscillating current flow through tube 37. The peak voltage produced across resistance 42 is approximately 90 volts negative with respect to ground potential. Oscillator 14, therefore, is essentially of the negative type and works only on one side of zero, in the present instance ground potential. I regard this feature as a practically important feature of the embodiment of my invention herein disclosed for the reason that if the oscillator 14 were of the conventional type which creates a current fluctuating about both sides of zero, the peak voltage above and below zero obtainable across resistance 42 would be only one-half that obtainable with the arrangement disclosed. Consequently, in order to obtain the same voltage variation with an oscillator of conventional type, it would be necessary to provide energizing voltage of approximately twice the magnitude to the oscillator from the rectifier 13 and filter 26.

The negative terminal of resistance 42 is connected through condenser 45 and an electrically shielded conductor 48 to the middle plate 3 of the measuring cell 1. The plate of condenser 45 remote from resistance 42 constitutes one oscillator output terminal while the grounded end of resistance 42 constitutes the other output terminal. The plate 2 of the measuring cell is connected by a shielded conductor 49 and a resistance-capacitance network 50 to the positive and grounded terminal of resistance 42 while the plate 4 of the measuring cell is connected by a shielded conductor 51 and a resistance-capacitance network 52 to the grounded terminal of resistance 42. In this manner the pulsating potential fluctuating at 400 cycles per second created by the oscillator 14 across resistance 42 is impressed between the middle plate 3 and each of the oppositely disposed plates 2 and 4 of the measuring cell.

This pulsating potential applied to the plates of the double capacitance comprising the measuring cell 1 has a peak value of approximately 90 volts which is appreciably greater than the ionization potentials for most gas and vapor atoms. For most gas and vapor atoms the ionizing potential is between 5 and 25 volts. While this fluctuating potential applied to the plates of the double capacitance of the measuring cell by the oscillator 14 is appreciably greater than the ionization potentials for most gases and vapors, it is considerably below the value at which a visible or brush discharge is created between the plates, however. Accordingly, any current flow which may be established between the plates of each capacitance is necessarily a silent and invisible discharge.

In the embodiment of my invention illustrated in Fig. 1, a unidirectional potential is also impressed between the middle plate 3 and each of the outer plates 2 and 4 of the double capacitance forming the measuring cell 1. These two unidirectional potentials are derived from the power pack 13 and are so chosen that the unidirectional potential impressed between the middle plate 3 and the plate 2 is equal to or slightly greater than the ionization potential for the particular gas whose presence and concentration it is desired to detect, while the magnitude of the unidirectional potential impressed between the plates 3 and 4 is so chosen as to be slightly less than said ionization potential. For example, when it is desired to detect the presence of and the concentration of hydrogen, $H_2$, in an atmosphere containing hydrogen and other gases or vapors, the unidirectional potential impressed between the plates 3 and 2 is adjusted to a value of approximately 15.9 volts, and the unidirectional potential impressed between the plates 3 and 4 is adjusted to a value of 15.7 volts. The ionization potential for hydrogen, $H_2$, is 15.9 volts, and accordingly, the unidirectional potential of 15.9 volts which is impressed between the measuring cell plates 2 and 3 is sufficient to maintain the voltage between plates 2 and 3 equal to or greater than the ionization potential for hydrogen during those intervals in which the oscillating potential derived from oscillator 14 is zero, or in other words during the intervals when no potential drop is produced across the resistance 42. On the other hand, the unidirectional potential of 15.7 volts impressed between the measuring cell plates 3 and 4 is insufficient to maintain the voltage between plates 3 and 4 equal to or above the ionization potential for hydrogen during the half cycles that the oscillating potential decreases to zero. The unidirectional potential of 15.7 volts applied between the plates 3 and 4 preferably is higher, however, than the ionizing potential of all other gases contained within the enclosure 1 which have lower ionization potentials than the gas under detection.

With these fluctuating and unidirectional potentials applied between the plate 3 of the measuring cell and each of the plates 2 and 4, I have discovered that the potentials between the plate 3 and each of the plates 2 and 4 will fluctuate at the frequency of the oscillating potential supplied by oscillator 14, namely 400 cycles per second, and more important, that the amplitude of the potential fluctuations between the plates 2 and 3 will be greater than those between the plates 3 and 4. The difference in the amplitude of fluctuation of the potential between plates 2 and 3 over the amplitude of fluctuation of the potential between plates 3 and 4 is due to the presence of hydrogen between each pair of plates, and accordingly, may be utilized to provide an indication of the presence thereof. The magnitude of the difference, moreover, will be proportional to the concentration of hydrogen in the mixture, and therefore, may also be utilized to provide a measure of the hydrogen concentration.

While my invention is not limited to the application of fluctuating current having a frequency of 400 cycles per second on the pairs of measuring cell plates from the oscillator 14, I prefer to operate the oscillator in the region of this frequency because I have discovered that the maximum fluctuation in amplitude of the potentials between the measuring cell plates is then produced when the gas under detection has a given concentration. Increase or decrease in said frequency appears to attenuate the amplitude of fluctuation of said potentials.

My invention is not limited in its use to the detection of the presence and measurement of the concentration of hydrogen in a mixture of gases or vapors but is believed to be of universal use. Thus the presence and concentration of any particular gas in any mixture of gases or vapors may be determined by means of the arrangement of my invention by utilizing the mixture as the dielectric between the plates of the measuring cell and by comparing the amplitude of the fluctuations in potential between the plates 2 and 3 with the amplitude of potential fluctuations created between the plates 3 and 4. Such comparison may conveniently be effected by means of the electronic amplifier 15.

The circuit path through which a unidirectional potential is impressed between the measuring cell plates 2 and 3 from the power pack 13 may be traced from the upper and positive terminal of the condenser 31 of the filter 26 through a conductor 53 to a conductor 54, the resistance-capacitance network 50, the shielded conductor 49, plate 2 of the measuring cell, plate 3, the shielded conductor 48, condenser 45, resistance 42 and the grounded conductor 33 to the lower and negative terminal of the condenser 31. The path through which a unidirectional potential is impressed between the measuring cell plates 3 and 4 may be traced from the positive terminal of condenser 31 through conductors 53 and 54 to the resistance-capacitance network 52, the shielded conductor 51, plate 4, plate 3, shielded conductor 48, condenser 45, resistance 42 and the grounded conductor 33 to the negative terminal of the condenser 31. It is noted that the polarity of the unidirectional potentials applied to the plates of the measuring cell is such as to render the potential of each of the plates 2 and 4 positive with respect to the potential of the middle plate 3.

The resistance-capacitance network 50 includes a voltage divider resistance 55 which is connected between conductor 54 and grounded conductor 33, and therefore, is connected directly across the terminals of the condenser 31. A condenser 56 is connected between the grounded end of resistance 55 and a contact 57 which is adjustable along the length of the resistance 55. A resistance 58 and a condenser 59 are connected in series with each other and in parallel to the condenser 56. Network 50 further includes a condenser 60 and a resistance 61 which are connected in series with each other in parallel to a series arrangement comprising the condenser 59 and a portion of resistance 58 depending upon the adjustment of a contact 62 along the length of resistance 58.

The resistance-capacitance network 52 includes elements similar to those contained in the network 50. In the network 52 the elements 63, 64, 65, 66, 67, 68, 69 and 70 correspond to the elements 55 through 62, respectively, of the network 50.

The resistance-capacitance networks 50 and 52 are provided for the dual purpose of filtering the unidirectional potential impressed by the power pack 13 on the plates of the measuring cell and for preventing the flow of oscillating current from the oscillator 14 to the power pack 13 from the measuring cell circuit.

The electronic amplifier 15 consists of two separate amplifier sections 71 and 72, each of which is provided with an input vacuum tube which may be of the commercially available 7C7 type and an output vacuum tube which may be of the 6N7 type. The input tube of section 71 has been indicated by the reference character 73 and the output tube has been indicated by the reference character 74. The input tube of section 72 is indicated by the numeral 75 and the output tube by the numeral 76. Each of the input tubes is a pentode, while the output tubes are twin triodes.

The input tube 73 includes an anode 77, a suppressor grid 78, a screen grid 79, a control grid 80, a cathode 81 and a filament 82. The input tube 75 includes similar elements 83 through 88. One triode section of the output tube 74 has been designated by the character A and includes an anode 89, a control grid 90, a cathode 91 and a heater filament 92 while the second triode, designated by the character B, includes an anode 93, a control grid 94, a cathode 95 and a heater filament 96. Each of the triodes A and B of tube 76 includes similar anode, control grid, cathode and heater filaments which have been indicated by the numerals 97 through 104.

Energizing current is supplied to all of the heater filaments 82, 88, 92, 96, 100 and 104 as well as to the heater filament 41 of the oscillator 14 from the transformer secondary winding 20. All of the heater filaments may desirably be connected in parallel to the secondary winding 20.

Plate 2 of the measuring cell 1 is coupled by means of the resistance-capacitance network 50 to the input circuit of the amplifier section 71, and plate 4 of the measuring cell is coupled by the resistance-capacitance network 52 to the input circuit of the amplifier section 72. Specifically, the control grid 80 of the tube 73 is connected by a conductor 105 to the output terminal of network 50 comprising the point of engagement of the condenser 60 and resistance 61 of the network 50, and the control grid 86 is connected by a conductor 106 to the output terminal of network 52 comprising the point of engagement of the condenser 68 and the resistance 69. The cathode 81 of tube 73 is connected through a biasing resistance 107 which is shunted by a condenser 108 to the grounded conductor 33 and thereby to the other output terminal of network 50. Similarly, the cathode 87 of tube 75 is connected through a resistance 109 which is shunted by a condenser 110 to the grounded conductor 33 and to the other output terminal of network 52.

Direct current voltage is supplied to each of the tubes 73 and 75 from the power pack 13. Thus, the anode circuit of tube 73 may be traced from the positive terminal of condenser 31 of the filter 26 through conductor 53, conductor 54, a pair of series connected resistances 111 and 112, anode 77, cathode 81, the parallel connected resistance 107 and condenser 108 and grounded conductor 33 to the negative terminal of condenser 31. A condenser 113 is connected between the point of engagement of resistances 111 and 112 and the grounded conductor 33 for additionally filtering the unidirectional voltage applied to the anode circuit of tube 73. Direct current voltage is impressed on the screen grid 79 from the conductor 54 through a resistance 79'.

Energizing voltage is supplied to the anode circuit of tube 75 through a circuit which may be traced from the positive terminal of condenser 31 through conductors 53 and 54, a pair of series connected resistances 114 and 115, anode 83, cathode 87, the parallel connected resistance 109 and condenser 110 and the grounded conductor 33 to the negative terminal of condenser 31. A condenser 116 is connected between the point of engagement of resistances 114 and 115 and the grounded conductor 33 for providing additional filtering of the unidirectional voltage impressed on the anode circuit of tube 75. Direct current voltage is impressed on the screen grid 85 from conductor 54 through a resistance 85'.

The output circuit of tube 73 is resistance-capacitance coupled by means of a condenser 117 and a resistance 118 to the input circuit of triode A of tube 74 and, similarly, the output circuit of the tube 75 is resistance-capacitance coupled by means of a condenser 119 and resistance 120 to the input circuit of the triode A of tube 76. Specifically, the control grid 90 of triode A of tube 74 is connected by a conductor 121 to the point of engagement of the condenser 117 and resistance 118, and the cathode 91 is directly connected to the grounded conductor 33 to which the other end of resistance 118 is also connected. Similarly, the control grid 98 of the triode A of tube 76 is connected by a conductor 122 to the point of engagement of condenser 119 and resistance 120, and the cathode 99 is directly connected to the grounded conductor 33 to which the other end of resistance 120 is also connected.

Anode voltage is supplied to the output circuit of the triode A of tube 74 through a circuit which may be traced from the positive terminal of condenser 31 through conductors 53 and 54, resistance 123, anode 89, cathode 91 and the grounded conductor 33 to the negative terminal of condenser 31. Anode voltage is supplied to the output circuit of the triode A of tube 76 through a similar circuit which may be traced from the positive terminal of condenser 31 through conductors 53 and 54, a resistance 124, the anode 97, cathode 99 and the grounded conductor 33 to the negative terminal of condenser 31.

The output circuit of the triode A of tube 74 is resistance-capacitance coupled by means of a condenser 125 and a pair of series connected resistances 126 and 127 to the input circuit of the triode B of tube 74. To this end the condenser 125 and the resistances 126 and 127 are connected in series between the anode 89 of triode A and the grounded conductor 33, and the control grid 94 of triode B is connected by a conductor 128 to the point of engagement of the resistances 126 and 127. Output voltage is supplied triode B of tube 74 through a circuit which may be traced from the positive terminal of condenser 31 through conductors 53 and 54, a resistance 129, anode 93, cathode 95 and the grounded conductor 33 to the negative terminal of condenser 31.

The output circuit of the triode A of tube 76 is resistance-capacitance coupled to the input circuit of the triode B of tube 76 by means of a condenser 130 and a pair of series connected resistances 131 and 132. The condenser 130 and the resistances 131 and 132 are connected in series between the anode 97 and the grounded conductor 33, and the control grid 102 of triode B is connected to the point of engagement of the resistances 131 and 132. Output voltage is supplied the triode B through a circuit which may be traced from the positive terminal of condenser 31 through conductors 53 and 54, a resistance 133, anode 101, cathode 103 and the grounded conductor 33 to the negative terminal of condenser 31.

As those skilled in the art will recognize the alternating component of the output current conducted by the triode B of the tube 74 will be inverted approximately 180° with respect to the alternating component of the current flowing in the output circuit of the triode A of that tube. Similarly, the alternating component of current flowing in the output circuit of the triode B of tube 76 will be inverted approximately 180° with respect to the alternating component of the current flowing in the output circuit of the triode A of tube 76. Such phase inversion is provided in order to obtain an efficient comparison of the amplified quantity of the signal voltage impressed on the input circuit of the amplifier section 71 from the measuring cell 1 to the amplified quantity of the signal voltage so impressed on the input circuit of the amplifier section 72.

Such comparison is effected in the embodiment of my invention illustrated in Fig. 1 by beating the alternating component of current flowing in the output circuit of triode A of tube 74 against the alternating component of the output current of the triode B of tube 76 by means including an iron core transformer 134 having two separate primary windings 135 and 136 and a single secondary winding 137. The primary winding 135 has one terminal connected by a conductor 138 to the point of engagement of the condenser 125 and resistance 126 in the output circuit of triode A of tube 74 and has its other terminal connected by a conductor 139, in which a condenser 140 is inserted, to the anode 101 of triode B of tube 76. With this arrangement, the alternating component of voltage in the output circuit of triode A of tube 74 is opposed to the alternating component of voltage in the output circuit of triode B of tube 76. Only the resultant of these two opposed alternating voltages will create an alternating flow through the transformer secondary winding 135.

One terminal of the transformer secondary winding 136 is connected by a conductor 141 to the point of engagement of the condenser 130 and resistance 131 in the output circuit of the triode A of tube 76 and the other terminal of the winding 136 is connected by a conductor 142 through a condenser 143 to the anode of the triode B of tube 74. The alternating component of voltage in the output circuits of triode A of tube 76 and triode B of tube 74 are opposed to each other through the transformer secondary winding 136, and therefore, any current flow through the winding 136 will be created by the resultant of the two opposed voltages.

The transformer primary windings 135 and 136 are so wound on the core of transformer 134 that when the alternating signal impressed on the input circuit of the amplifier section 71 is of greater amplitude than the alternating signal impressed on the input circuit of the amplifier section 72 the magnetic flux created by the resultant current flow through the winding 135 will be in the same direction in the core of transformer 134 and will assist the magnetic field created by the resultant current flow through the transformer secondary winding 136. Consequently, the magnetic field created by the current flow through the winding 135 assists the magnetic field created by the winding 136 in producing a voltage in the transformer secondary winding 137. Such voltage created in the winding 137 is representative of the difference in amplitude between the alternating signal impressed on the input circuit of amplifier section 71 and that impressed on the input circuit of amplifier section 72 and is impressed on the instrument 16 through a rectifier 144. The instrument 16 may be a simple indicating milliammeter or, if desired, may be a recording and/or controlling instrument such as the Brown electronic self-balancing potentiometer disclosed in the copending application of Walter P. Wills, Serial No. 421,173 filed December 1, 1941, now Patent No. 2,423,540 of July 8, 1947.

By way of example only, it is noted that when the plates of the measuring cell are of the dimensions described, 110 volt, 60 cycle current is supplied to the apparatus by the mains 23 and 24, rectifier tube 25 is a type 5Z4, the oscillator 37 is a type 7A4, the tubes 73 and 75 are both of the 7C7 type and the tubes 74 and 76 are both of the 6N7 type, the values of the various circuit components listed in the following table may be advantageously employed.

| Part | | Value |
|---|---|---|
| 30 | microfarads | 8 |
| 31 | do | 8 |
| 32 | do | 8 |
| 35 | ohms | 8,000 |
| 42 | do | 10,000 |
| 43 | microfarads | 0.2 |
| 44 | do | 0.2 |
| 45 | do | 0.5 |
| 55 | megohms | 1 |
| 56 | microfarads | 0.25 |
| 58 | megohms | 1 |
| 59 | microfarads | 0.25 |
| 60 | do | 0.01 |
| 61 | megohms | 0.5 |
| 63 | do | 1 |
| 64 | microfarads | 0.25 |
| 66 | megohms | 1 |
| 67 | microfarads | 0.25 |
| 68 | do | 0.01 |
| 69 | megohms | 0.5 |
| 107 | ohms | 4,000 |
| 108 | microfarads | 25 |
| 109 | ohms | 4,000 |
| 110 | microfarads | 25 |
| 79' | megohms | 1 |
| 85' | do | |
| 111 | ohms | 250,000 |
| 112 | do | 500,000 |
| 113 | microfarads | 0.2 |
| 114 | ohms | 250,000 |
| 115 | do | 500,000 |
| 116 | microfarads | 0.2 |
| 117 | do | 0.02 |

| Part | Value |
|---|---|
| 118 | 250,000 ohms |
| 119 | 0.02 microfarads |
| 120 | 250,000 ohms |
| 123 | 15,000 do |
| 124 | 15,000 do |
| 126 | 250,000 do |
| 127 | 500,000 do |
| 129 | 15,000 do |
| 131 | 250,000 do |
| 132 | 500,000 do |
| 133 | 15,000 do |
| 140 | 0.2 microfarads |
| 143 | 0.2 do |

In the operation of the gas analysis apparatus disclosed in Fig. 1, the negatively pulsating potential produced by the oscillator 14 serves as a striking voltage or ionizing voltage for initiating energy transfer between the middle plate 3 of the measuring cell and the associated plates 2 and 4. This negative pulsating potential is greater than the ionizing potentials of any gases likely to be contained within the enclosures. A unidirectional potential is also impressed between the plates 2 and 3 of the measuring cell which is sufficient to maintain the potential between these plates equal to or slightly greater than the ionization potential of the gas or vapor whose presence and concentration in the enclosure it is desired to detect. A unidirectional potential slightly less than the ionization potential of the gas under detection is impressed between the measuring cell plates 3 and 4. The unidirectional potential impressed between the plates 3 and 4 preferably is greater than the ionization potentials all of the gases within the enclosure S having ionization potentials lower than the gas to be detected.

With this arrangement, the potentials of both plates 2 and 4 will fluctuate at the oscillator frequency relatively to the potential of plate 3, the amplitude of variation of the potential changes between plates 2 and 3 being greater than that between plates 3 and 4. The magnitude of the difference in amplitude of variation varies in accordance with the concentration of the gas under detection within the enclosure S.

The relation of the voltages impressed between the plates of the measuring cell I are represented graphically in Fig. 5 wherein the saw tooth curve 145 represents the negative voltage impressed between the middle plate 3 and each of the other plates 2 and 4 by the oscillator 14, the horizontal line 146 represents the unidirectional potential impressed between the plates 2 and 3 from the power pack 13 and the horizontal line 147 represents the unidirectional potential impressed between the plates 3 and 4 by the power pack 13. In Fig. 5 the ordinate represents voltage and the abscissa represents time. In Fig. 5, zero potential has been indicated as ground potential.

The principles of operation of the method and apparatus herein disclosed appears to be common to and apply to all gases and vapors, and may therefore, be used to advantage in analyzing all types of gases and vapors. The value of the ionization potential for any particular gas is available in the prior art publications, or may be readily determined in a manner known in the art. Hence, the values of the unidirectional potentials required to be applied to the plates of the measuring cell I in analyzing the composition of any mixture of gases or vapors may be readily ascertained. To facilitate use of the invention, however, it is noted that the values shown in the following table have been employed successfully in the measuring apparatus herein disclosed for detecting the presence and concentration of the indicated gases. Only the values for a few representative gases are given. Column I indicates the voltage impressed between the plates 2 and 3 of the measuring cell I and column II indicates the unidirectional voltage impressed between the plates 3 and 4.

| Gas | I | II |
|---|---|---|
| Hydrogen ($H_2$) | 15.9 | 15.7 |
| Nitrogen (N) | 16.7 | 16.5 |
| Oxygen ($O_2$) | 12.6 | 12.4 |
| Carbon Dioxide ($CO_2$) | 11.4 | 11.1 |
| Carbon Monoxide (CO) | 13.5 | 13.2 |
| Sulphur Dioxide ($SO_2$) | 14.8 | 14.6 |
| Sulphur Trioxide ($SO_3$) | 15.3 | 15.1 |

The voltages listed in the above table are not necessarily the most ideal voltages to be applied to the plates of the measuring cell but are merely representative of voltages which have provided satisfactory measurements of the presence of and the concentration of the indicated gases. The voltages given were found to be satisfactory with a measuring cell of the configuration and dimensions of the measuring cell disclosed in Figs. 2, 3 and 4 and described in connection therewith.

It will be apparent that the invention is not limited in its application to the use of a measuring cell of such configuration and dimensions and that it is not necessary that the plates be composed of brass. Nor is it necessary that the plates be made of a metallic substance. For example, the plates may be made of any electrically conducting surface such as graphite. Also, in high temperature applications it may be desirable to use spacers composed of quartz instead of the plaster of Paris spacers described in connection with Figs. 3 and 4.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent is as follows:

1. The method of detecting the presence of a gas in an atmosphere which includes the steps of exposing the plates of each of two similar electrical capacitances to said atmosphere, impressing between the plates of each capacitance a fluctuating potential having a frequency of approximately 400 cycles per second, impressing a steady potential of predetermined amplitude between the plates of one capacitance, impressing a steady potential of amplitude different than said predetermined amplitude between the plates of the other capacitance, and comparing the amplitudes of the charges accumulated on the plates of each capacitance.

2. The method of detecting the presence of a gas in an atmosphere which includes the steps of exposing the plates of each of two similar electrical capacitances to said atmosphere, impressing a fluctuating potential between the plates of each capacitance of amplitude greater than the ionization potential of the gas to be detected, impressing a steady potential between the plates of one capacitance of amplitude approximately equal to the ionization potential of the gas to be detected, impressing a steady potential between the plates of the other capacitance of amplitude less than the ionization potential of the gas to be detected, and comparing the amplitudes of the charges accumulated on the plates of each capacitance.

3. The method of detecting the presence of a gas in an atmosphere which includes the steps of exposing the plates of each of two similar electrical capacitances to said atmosphere, impressing a fluctuating potential between the plates of each capacitance of amplitude greater than the ionization potential of the gas to be detected, impressing a steady potential between the plates of one capacitance of amplitude approximately equal to the ionization potential of the gas to be detected, impressing a steady potential between the plates of the other capacitance of amplitude less than the ionization potential of the gas to be detected, and comparing the amplitudes of the potential variations between the plates of one capacitance with the potential variations between the plates of the other capacitance.

4. The method of detecting the presence of one gas in another which includes the steps of exposing the plates of each of two similar electrical capacitances to the gaseous mixture, applying a complex electric potential between the plates of each capacitance, said potential comprising a fluctuating component of amplitude greater than the ionization potentials of both of the gases of the gaseous mixture, including a steady component between the plates of one capacitance which is of amplitude approximately equal to the ionization potential of the gas to be detected, and including a steady component between the plates of the other capacitance which is of amplitude less than the ionization potential of said gas to be detected, and comparing the magnitude of the currents conducted to each pair of plates.

5. The method of measuring the concentration of a gas in an atmosphere which includes the steps of exposing two pairs of spaced conducting surfaces to said atmosphere, the electrical capacitance between one pair of surfaces being the same as that between the other pair when the dielectric between each pair of surfaces is the same and is not subjected to external forces, impressing a fluctuating potential between each pair of surfaces of amplitude greater than the ionization potential of the gas under measurement, impressing a steady potential between one pair of surfaces of amplitude approximately equal to the ionization potential of the gas under measurement, impressing a steady potential between the other pair of surfaces which is greater than the ionization potentials of all of the gases in said atmosphere having lower ionization potentials than said gas under measurement but less than the ionization potential of said gas under measurement, and measuring the difference in the currents conducted to both pairs of surfaces.

6. The method of detecting the presence of a gas in an atmosphere which includes the steps of exposing two pairs of electrodes to said atmosphere, impressing a fluctuating potential between each pair of electrodes of amplitude greater than the ionization potential of the gas to be detected, impressing a steady potential between the electrodes of one pair of electrodes of amplitude approximately equal to the ionization potential of the gas to be detected, impressing a steady potential between the electrodes of the other pair of electrodes of amplitude less than the ionization potential of the gas to be detected, and comparing the magnitude of the currents conducted to each pair of electrodes.

7. The method of detecting the presence of a gas in an atmosphere which includes the steps of exposing two pairs of electrodes to said atmosphere, impressing a fluctuating potential between each pair of electrodes of amplitude sufficient to ionize the gas to be detected, impressing a steady potential between the electrodes of one pair of electrodes of amplitude just sufficient to sustain the ionization of the gas to be detected, impressing a steady potential between the electrodes of the other pair of electrodes just insufficient to sustain the ionization of the gas to be detected, and comparing the amplitude of the potential variations between one pair of electrodes with the potential variations between the other pair of electrodes.

8. The method of detecting the presence of a gas in an atmosphere which includes the steps of exposing three electrodes to said atmosphere, impressing a fluctuating potential between one of said electrodes and each of the other electrodes of amplitude sufficient to ionize the gas to be detected, impressing a steady potential between said one electrode and one of the other electrodes of amplitude just sufficient to sustain the ionization of the gas to be detected, impressing a steady potential between said one electrode and the remaining one of said electrodes of amplitude just insufficient to sustain the ionization of the gas to be detected, and comparing the amplitudes of the potential variations between said one electrode and each of said other electrodes.

9. The method of detecting the presence of a gas in an atmosphere which includes the steps of exposing at least three electrodes to said atmosphere, impressing a potential fluctuating at a frequency of approximately 400 cycles per second between one of said electrodes and each of the other electrodes of amplitude sufficient to ionize the gas to be detected, impressing a steady potential between said one electrode and one of the other electrodes of amplitude at least as great as the ionization potential of the gas under detection, impressing a steady potential between said one electrode and the remaining one of said electrodes of amplitude less than the ionization potential of the gas under detection, and comparing the amplitudes of the potential variations between said one electrode and each of said other electrodes.

10. The method of detecting the presence of a gas in an atmosphere which includes the steps of exposing at least three electrodes to said atmosphere, said electrodes being so arranged that the electrical capacitance between one of said electrodes and a second one of said electrodes is approximately the same as the electrical capacitance between said one electrode and the third electrode when said electrodes are not subjected to any external forces, impressing a potential fluctuating at a frequency of approximately 400 cycles per second between said one and each of said second and third electrodes of amplitude sufficient to ionize the gas to be detected, impressing a steady potential between said one electrode and said second electrode of amplitude at least equal to the ionization potential of the gas under detection, impressing a steady potential between said one electrode and said third electrode of amplitude less than the ionization potential of the gas under detection, separately amplifying the potential variations between said one electrode and each of said other electrodes, and comparing the amplitudes of the amplified quantities of said potential variations.

11. Apparatus for detecting the presence of a gas in an atmosphere including three electrodes which are insulated from each other and spaced apart to permit passage therebetween of said atmosphere, means to impress a fluctuating potential between one of said electrodes and each of the other of said electrodes, means to impress a steady potential between said one electrode and one of the other electrodes of amplitude sufficient to ionize the gas under detection but not gases having higher ionization potentials, means to impress a steady potential between said one electrode and the remaining one of said electrodes of amplitude insufficient to ionize the gas under detection but sufficient to ionize all gases having lower ionization potentials, and means to compare the amplitudes of the potential variations between said one electrode and each of said other electrodes.

12. Apparatus for detecting the presence of a gas in an atmosphere including three electrodes which are insulated from each other and spaced apart to permit passage therebetween of said atmosphere, means to impress a potential fluctuating at a frequency of approximately 400 cycles per second between one of said electrodes and each of the other electrodes of amplitude greater than the ionization potential of the gas to be detected, means to impress a steady potential between said one electrode and one of the other electrodes of amplitude sufficient to ionize the gas under detection, but not gases having higher ionization potentials, means to impress a steady potential between said one electrode and the remaining one of said electrodes of amplitude insufficient to ionize the gas under detection but sufficient to ionize all gases having lower ionization potentials, and means to compare the amplitudes of the potential variations between said one electrode and each of said other electrodes.

13. Apparatus for detecting the presence of a gas in an atmosphere including three electrodes which are insulated from each other and spaced apart to permit passage therebetween of said atmosphere, said electrodes being so arranged that the electrical capacitance between one of said electrodes and a second one of said electrodes is approximately the same as the electrical capacitance between said one electrode and the third electrode when said electrodes are subjected to the same external forces, means to impress a potential fluctuating at a frequency of approximately 400 cycles per second between one of said electrodes and each of the other electrodes of amplitude sufficient to ionize the gas to be detected, means to impress a steady potential between said one electrode and one of the other electrodes of amplitude sufficient to ionize the gas under detection but not gases having higher ionization potentials, means to impress a steady potential between said one electrode and the remaining one of said electrodes of amplitude insufficient to ionize the gas under detection but sufficient to ionize all gases having lower ionization potentials, and means to compare the amplitudes of the potential variations between said one electrode and each of said other electrodes.

14. Apparatus for detecting the presence of a gas in an atmosphere including three electrodes which are insulated from each other and spaced apart to permit passage therebetween of said atmosphere, said electrodes being so arranged that the electrical capacitance between one of said electrodes and a second one of said electrodes is approximately the same as the electrical capacitance between said one electrode and the third electrode when the dielectrics between said electrodes are subjected to the same external forces, an electronic oscillator to produce a potential fluctuating at a frequency of approximately 400 cycles per second, a source of unidirectional potential, an electrical network to derive from said source of unidirectional potential a unidirectional potential of amplitude sufficient to ionize the gas to be detected but not gases having higher ionization potentials, a separate electrical network to derive from said source of unidirectional potential a unidirectional potential of amplitude insufficient to ionize the gas under detection but sufficient to ionize all gases in said atmosphere having ionization potentials lower than said gas under detection, means including separate shielded conductors connected to each one of said electrodes to impress said fluctuating potential between said one of said electrodes and each of the other electrodes, to impress said first mentioned derived unidirectional potential between said one electrode and said second electrode, and to impress said second mentioned derived unidirectional potential between said one electrode and the third electrode, and means to compare the amplitudes of the potential variations between said one electrode and each of said other electrodes.

15. The combination of claim 14 wherein the fluctuating potential produced by said electronic oscillator fluctuates only between a zero and a negative value.

16. The combination of claim 14 wherein said electronic oscillator includes an electronic valve having anode, cathode and control grid elements, a transformer winding having a center tap, a connection from said cathode to said center tap, a connection from said control grid to one end of said winding, a first condenser, a connection from said anode to the other end of said winding including said first condenser, a second condenser connected between said center tap and the last mentioned end of said winding, a source of energizing unidirectional potential having its positive terminal connected to the negative terminal of the first mentioned unidirectional potential and connected directly to ground, a resistance, a connection between said anode and the positive terminal of said second source including said resistance, a third condenser, and a connection to one output terminal of said oscillator from said anode including said condenser, the other output terminal of said oscillator comprising the grounded end of said resistance.

17. The combination of claim 14 wherein the means to compare the amplitudes of the potential variations between said one electrode and each of the other electrodes includes an electronic amplifier having separate channels each of which has input and output terminals for amplifying the potential variations produced between the pairs of electrodes, means to impress the potential variations between said one electrode and the second electrode to the input terminals of one channel of said amplifier, means to impress the potential variations between said one electrode and the third electrode to the input terminals of the other channel, means to oppose the amplified quantities of said potentials at the output terminals of said channels, and means to exhibit the difference between the said amplified quantities.

18. The combination of claim 14 wherein the means to compare the amplitudes of the potential variations between said one electrode and each of the other electrodes includes an electronic amplifier having separate channels each of which has input and output terminals for amplifying the potential variations produced between the pairs of electrodes, a first filter network, a connection between said one electrode and the second electrode including said first filter network to the input terminals of one channel of said amplifier, a second filter network, a connection between said one electrode and the third electrode including said second filter network to the input terminals of the other channel of said amplifier, means to oppose the amplified quantities of said potentials at the output terminals of said channels, and means to exhibit the difference between the said amplified quantities.

WILLIAM F. ERTZMAN.

REFERENCES CITED

The following references are of record in the file of this patent:

UNITED STATES PATENTS

| Number | Name | Date |
|---|---|---|
| 1,070,556 | Strong | Aug. 19, 1931 |
| 1,334,143 | Dushman | Mar. 16, 1920 |
| 1,421,720 | Roberts | July 4, 1922 |
| 2,189,402 | Pasma | Feb. 6, 1940 |
| 2,258,045 | Christie | Oct. 7, 1941 |
| 2,280,086 | Hayward | Apr. 21, 1942 |
| 2,288,364 | McArthur | June 30, 1942 |
| 2,349,992 | Schrader | May 30, 1944 |
| 2,375,280 | Calbick | May 8, 1945 |